(12) United States Patent
Thomas

(10) Patent No.: US 11,359,918 B2
(45) Date of Patent: Jun. 14, 2022

(54) ULTRASONIC TESTING WITH SINGLE SHOT PROCESSING

(71) Applicant: Olympus Scientific Solutions Americas Corp., Waltham, MA (US)

(72) Inventor: Andrew Thomas, Waltham, MA (US)

(73) Assignee: Olympus Scientific Solutions Americas Corp., Waltham, MA (US)

(*) Notice: Subject to any disclaimer, the term of this patent is extended or adjusted under 35 U.S.C. 154(b) by 62 days.

(21) Appl. No.: 16/937,826

(22) Filed: Jul. 24, 2020

(65) Prior Publication Data

US 2022/0026201 A1 Jan. 27, 2022

(51) Int. Cl.
| | |
|---|---|
| *G01N 29/44* | (2006.01) |
| *G01N 29/11* | (2006.01) |
| *G01N 29/14* | (2006.01) |
| *G01B 17/02* | (2006.01) |

(52) U.S. Cl.
CPC ............ *G01B 17/02* (2013.01); *G01N 29/11* (2013.01); *G01N 29/14* (2013.01); *G01N 29/4427* (2013.01)

(58) Field of Classification Search
CPC ........ G01B 17/02; G01N 29/11; G01N 29/14; G01N 29/4427
USPC .......................................................... 73/609
See application file for complete search history.

(56) References Cited

U.S. PATENT DOCUMENTS

| | | | | |
|---|---|---|---|---|
| 4,799,177 A | * | 1/1989 | Sarr ....................... | G01N 29/11 |
| | | | | 702/171 |
| 5,257,624 A | | 11/1993 | Fraser et al. | |
| 5,596,508 A | | 1/1997 | Cuffe | |
| 6,634,233 B2 | * | 10/2003 | He .......................... | G01N 29/28 |
| | | | | 73/622 |
| 6,883,376 B2 | * | 4/2005 | He .......................... | G01N 29/46 |
| | | | | 73/622 |
| 7,963,166 B2 | | 6/2011 | Thomas | |
| 8,001,841 B2 | | 8/2011 | Thomas | |
| 8,001,842 B2 | | 8/2011 | Thomas | |
| 10,024,822 B2 | * | 7/2018 | Chatellier .............. | G01N 29/46 |
| 2008/0202244 A1 | | 8/2008 | Cuffe et al. | |
| 2013/0060488 A1 | | 3/2013 | Ghabour et al. | |
| 2015/0109611 A1 | * | 4/2015 | Campagne ......... | G01N 29/2418 |
| | | | | 356/72 |
| 2017/0052253 A1 | | 2/2017 | Zhu et al. | |

FOREIGN PATENT DOCUMENTS

EP 0716301 * 6/1996 ............. G01B 17/02

OTHER PUBLICATIONS

"International Application Serial No. PCT/US2021/042712, International Search Report dated Nov. 17, 2021", 2 pgs.

(Continued)

*Primary Examiner* — Jacques M Saint Surin
(74) *Attorney, Agent, or Firm* — Schwegman Lundberg & Woessner, P.A.

(57) ABSTRACT

Examples of the present subject matter provide techniques for measuring thicknesses of materials using one or more acquisition cycles. The data from the one or more acquisition cycles may be amplified using a specified gain across the signal response, converted to a digital signal, and stored in a memory. The digital signal may be retrieved from memory, and signal processing techniques using one or more time-variable threshold(s) may be used to calculate one or more thickness(es) of the testing object.

22 Claims, 9 Drawing Sheets

OTHER PUBLICATIONS

"International Application Serial No. PCT/US2021/042712, Written Opinion dated Nov. 17, 2021", 5 pgs.

Wang, et al., "Photoacoustic imaging with a commercial ultrasound system and a custom probe", Ultrasound in medicine & biology 37.3, Retrieved on Sep. 27, 2021 (Sep. 27, 2021) from <https://www.ncbi.nlm.nih.gov/pmc/articles/PMC3040410>, 484-492.

* cited by examiner

ULTRASONIC TESTING WITH SINGLE SHOT PROCESSING

TECHNICAL FIELD

The present disclosure generally relates to ultrasonic thickness measurement techniques.

BACKGROUND

Ultrasonic thickness gages can measure the thickness of a wide variety of products, such as pipes and tanks, in a non-destructive manner. Ultrasonic thickness measurement is typically utilized where mechanical measurements are impractical, for example when only one side of the part being measured is accessible. Generally, ultrasonic thickness measurement involves measuring how long it takes for ultrasound pulses to travel through a testing object. An ultrasound probe transmits one or more pulses into the testing object and waits to receive an echo of the pulse(s) from the far side of the testing object. The thickness can therefore be calculated from the time between transmitting the pulse and receiving the echo.

However, in one approach, ultrasound thickness gauging may involve numerous iterative signal processing passes (e.g., 12-20 transmit/receive signal pairs) to generate a thickness measurement. Each pass can include transmitting a pulse and measuring the corresponding echo. The configuration for each pass may be modified or tuned such as based on the readings from the previous pass. For example, the gain applied to a received echo may be changed for different passes (e.g., for different transmit/receive signal pairs). Generally, the echoes in received signal are located, and iterative passes may be used to adaptively match an applied gain for detecting echoes in order to perform the thickness measurement. For example, different gains may be applied at different temporal locations in the received signal to compensate for differing amplitudes of the echoes. An iterative or multi-pass approach as mentioned above can be laborious and time consuming, leading to slow measurement times.

BRIEF DESCRIPTION OF THE DRAWINGS

Various ones of the appended drawings merely illustrate example implementations of the present disclosure and should not be considered as limiting its scope.

DETAILED DESCRIPTION

The inventor has recognized, among other things, a need in the art for an inspection system that overcomes the challenges of ultrasonic thickness measurements discussed above. Examples of the present subject matter provide techniques for measuring thicknesses of materials using as few as a single transmit/receive acquisition cycle (also referred to as a single shot). The data from the acquisition cycle may be amplified or otherwise scaled using a specified temporal gain profile across the signal response, converted to a digital signal, and stored in a memory. The digital signal may be retrieved from memory, and signal processing techniques using one or more time-variable thresholds may be used to calculate thicknesses of the testing object. Using the techniques described herein, as compared to an iterative process (up to 12-20 iterative passes), provides faster measurement times and improves accuracy of the measurements, as described herein.

This document describes a method comprising: in response to a transmitted ultrasound signal into a test object, acquiring from a transducer probe a signal response in one or more acquisition cycles, the signal response including an electrical representation of one or more echoes received from the test object; applying a gain profile across the signal response to generate an amplified signal response; digitizing the amplified signal response to generate a digitized signal response; and calculating from the digitized signal response one or more thicknesses of the test object using at least one time-variable threshold based on one or more associated threshold crossing events.

This document also describes an inspection system. The inspection system may include a transducer probe to transmit an ultrasound wave into a test object and to receive one or more reflections of the transmitted ultrasound wave and to convert the one or more reflections into an electrical signal in one or more acquisition cycles. The inspection system may also include an analog circuit to amplify the electrical signal with a specified gain profile across the electrical signal and to convert the amplified electrical signal into a digital signal. The inspection system may further include a processor to calculate from the digital signal one or more thicknesses of the test object using at least one time-variable threshold based on one or more associated threshold crossing events.

This document further describes a machine-storage medium embodying instructions that, when executed by a machine, cause the machine to perform operations comprising: receiving a digitized signal response having a specified gain; and calculating from the digitized signal response one or more thicknesses of the test object using at least one time-variable threshold based on one or more associated threshold crossing events.

Figure 1:
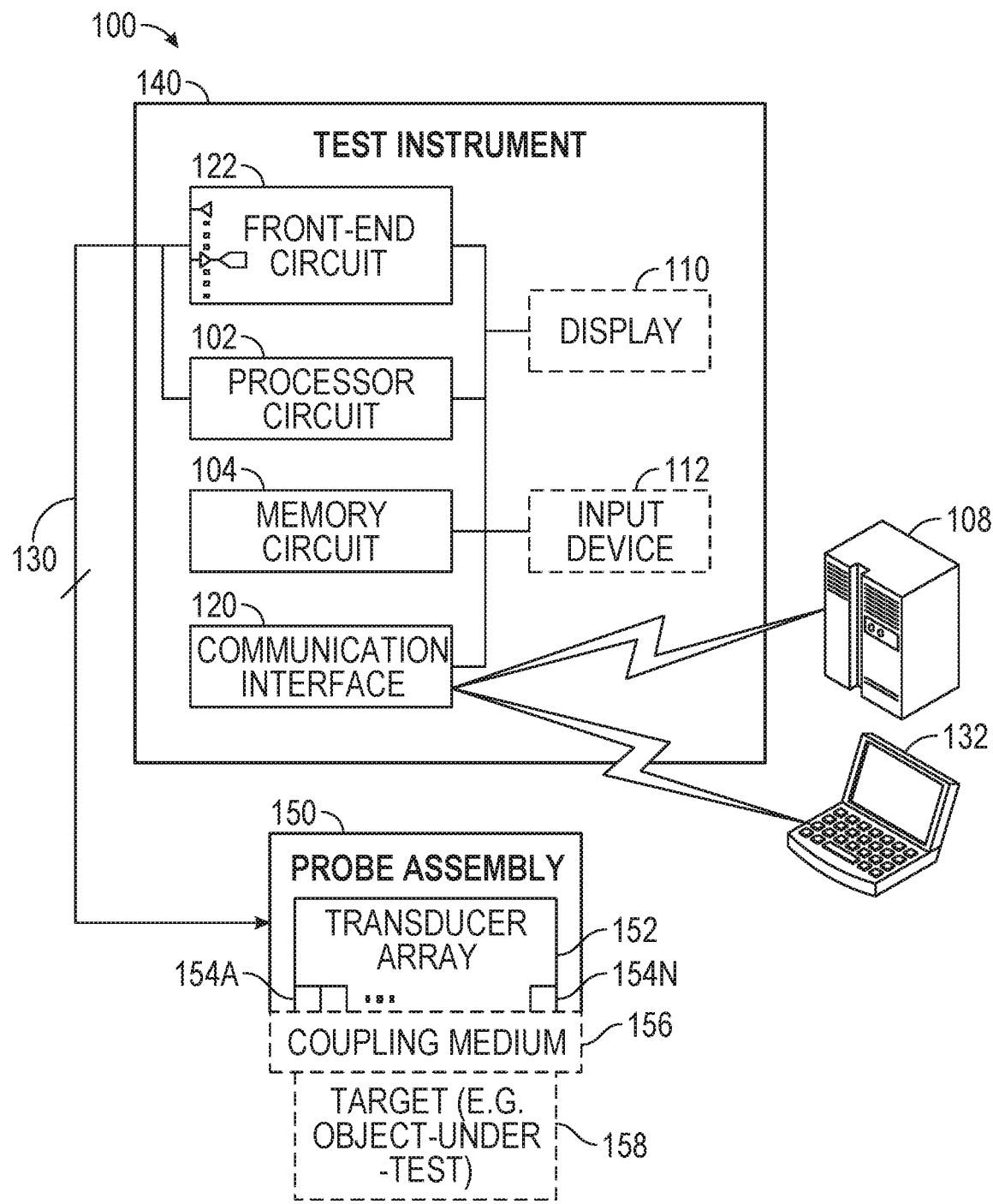
FIG. 1 illustrates an acoustic inspection system, according to an example of the present subject matter.

FIG. 1 illustrates generally an example comprising an acoustic inspection system 100, such as can be used to perform one or more techniques showed and described elsewhere herein. The inspection system 100 may include a test instrument 140, such as a hand-held or portable assembly. The test instrument 140 may be electrically coupled to a probe assembly, such as using a multi-conductor interconnect 130. The probe assembly 150 may include one or more electroacoustic transducers, such as a transducer array 152 including respective transducers 154A through 154N. The transducers array may follow a linear or curved contour or may include an array of elements extending in two axes, such as providing a matrix of transducer elements. The elements need not be square in footprint or arranged along a straight-line axis. Element size and pitch may be varied according to the inspection application.

A modular probe assembly 150 configuration may be used, such as to allow a test instrument 140 to be used with various probe assemblies 150. Generally, the transducer array 152 includes piezoelectric transducers, such as can be acoustically coupled to a target 158 (e.g., an object under test) through a coupling medium 156. The coupling medium can include a fluid or gel or a solid membrane (e.g., an elastomer or other polymer material), or a combination of fluid, gel, or solid structures. The coupling medium may assist in the propagation of acoustic waves, as described herein. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to measure on or more thicknesses of the target 158 based on receiving scattered or reflected acoustic energy elicited in response to the insonification, e.g., echoes.

While FIG. 1 shows a single probe assembly 150 and a single transducer array 152, other configurations may be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a compute facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. For example, a plurality of analog-to-digital converters may be provided in parallel, forming different channels.

Figure 2:
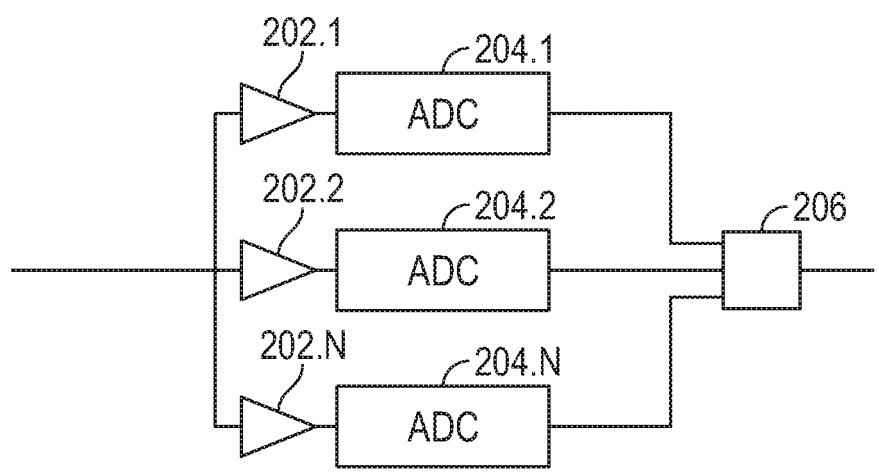
FIG. 2 a circuit portion of a front end, according to an example of the present subject matter.

FIG. 2 illustrates an example circuit portion of a front end, according to an example of the present subject matter. The example circuit may provide high dynamic range analog-to-digital conversion. The example circuit may include a plurality of amplifiers 202.1-202.N and ADCs 204.1-204.N and a digital mixer 206. The amplifiers 202.1-202.N may be provided as variable gain amplifiers (VGAs), programmable gain amplifiers, or the like. The input of the amplifiers 202.1-202.N may be the received signal response from the transducer probe assembly. The amplifiers 202.1-202.N may amplify the received signal response with a specified gain across the signal response to generate an amplified signal response. As discussed below in further detail below, the gain may be constant across the signal response. The plurality of ADCs 204.1-204.N may be arranged in parallel, each coupled to a respective one of the amplifiers 202A-202.N, with each ADC operating on a portion or channel of the amplified signal response. Each ADC may sample a different portion of the signal response, in time, such as an in a blended manner, as described above. For example, each ADC may receive a different zoom aspect of the amplified signal response, with one or more ADCs receiving a large zoom aspect and one or more ADCs receiving a small zoom aspect. The outputs of the ADCs 204.1-204.N may be combined (e.g., different zooms blended) by the digital mixer 206. For example, the parallel analog to digital conversion may be performed using the techniques described in U.S. Pat. Nos. 7,963,166; 8,001,841; and/or 8,001,842; all entitled "Ultrasonic fault detection system using a high dynamic range analog to digital conversion system," which are incorporated herein by reference in their entirety, including but not limited to those portions that specifically appear hereinafter, the incorporation by reference being made with the following exception: In the event that any portion of the above-referenced patents is inconsistent with this application, this application supersedes the above-referenced patents.

Returning to FIG. 1, the front-end circuit 122 can be coupled to and controlled by one or more processor circuits, such as a processor circuit 102 included as a portion of the test instrument 140. The processor circuit can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a compute facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-scan matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, voice, gestures, or the like, for receiving operator commands, configuration information, or responses to queries.

Examples of the present subject matter may measure thicknesses of a testing object in two phases: a) an acquisition phase, and b) a playback phase.

Figure 3:
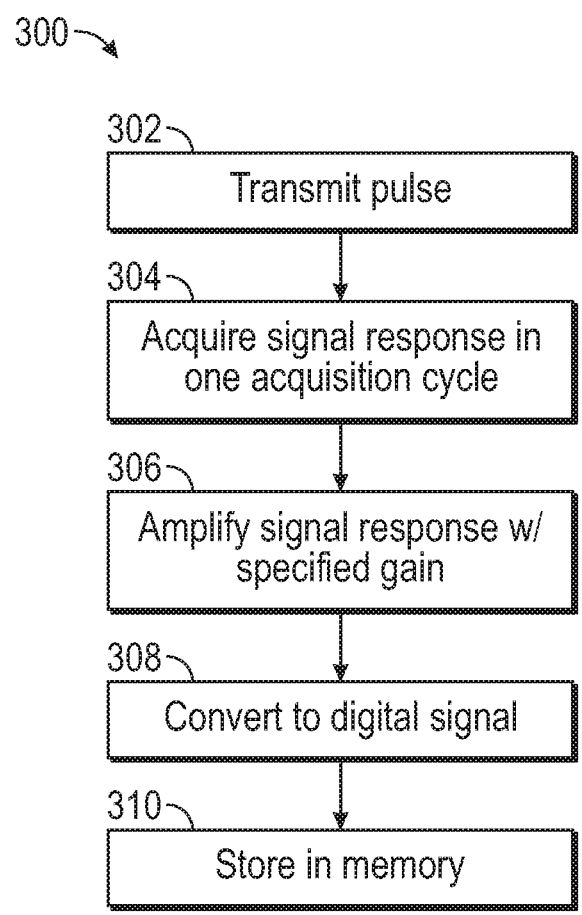
FIG. 3 is a flow diagram for an acquisition phase, according to an example of the present subject matter.

FIG. 3 is a flow diagram for an acquisition phase 300, according to an example of the present subject matter. At 302, a pulse may be transmitted to a transducer probe to control the transducer probe to generate and transmit an ultrasound signal into a target, e.g., a test object or object-under-test. At 304, a signal response from the transducer probe may be acquired in a single acquisition cycle (e.g., without requiring iterative or multi-pass processing involving multiple transmit/receive pulse iterations). The signal response may include an electrical representation of one or more echoes received from the test object in response to the transmitted ultrasound signal. In another example, multiple signal responses may be acquired sequentially in a plurality of acquisition cycles. For example, five pulses may be transmitted sequentially to the transducer probe to control the transducer probe to generate and transmit respective ultrasound signals into the target. As explained in further detail below, these multiple signal responses may be digitized using parallel analog-to-digital conversions and then time interleaved together to generate a digitized signal response.

The above-described operations may support different modes of measuring a time interval for calculating a thickness of a test object. Mode 1 may include measuring the time interval between the pulse that generates the ultrasound signal and the first returning echo from the back wall of the test object. Mode 2 may include measuring the time interval between an interface echo returned from a front wall to the back wall of the test object. Mode 3 may include measuring the time interval between an interface echo returned from the back wall to the front wall of the test object. Consequently, the signal response acquired in a single acquisition phase may include the echo information for each of selected mode.

At 306, the signal response may be amplified so that a specified gain profile may be applied across the signal response to generate an amplified signal response. The gain profile may include a plurality of gain values for different respective zoom aspects, as described above. The gain may be set so that is constant across the signal response with respect to time. That is, each timed portion of the signal response may have the same gain profile, and the gain may be not be dependent on time.

At 308, the amplified signal response may be digitized and converted to a digitized signal response. As described above, in the example of using a single acquisition cycle, this may include using a high-dynamic-range analog to digital conversion system to perform a plurality of analog-to-digital conversions using parallel conversion circuits and blending outputs from the parallel conversion circuits corresponding to the plurality of analog-to-digital conversions to generate the digitized signal response. In the example of using multiple acquisition cycles, the multiple signal response may be converted using a parallel analog-to-digital conversion system to perform a plurality of analog to digital conversions. The outputs of those conversions may then be time interleaved together to generate the digitized signal response.

At 310, the digitized signal response may be stored in a memory (e.g., memory circuit 104). The digitized signal response may be in the form of A-scans. An A-scan presents the amount of ultrasound energy as a function of time, e.g., amplitude versus time. In an example, the ADCs may be initiated and begin digitization a few microseconds before the pulse is transmitted to generate the ultrasound signal (e.g., at 304). The digitization may continue for a period of time to fully capture the signal response. The stored signal response may then be available for retrieval and processing in the playback phase.

Figure 4:
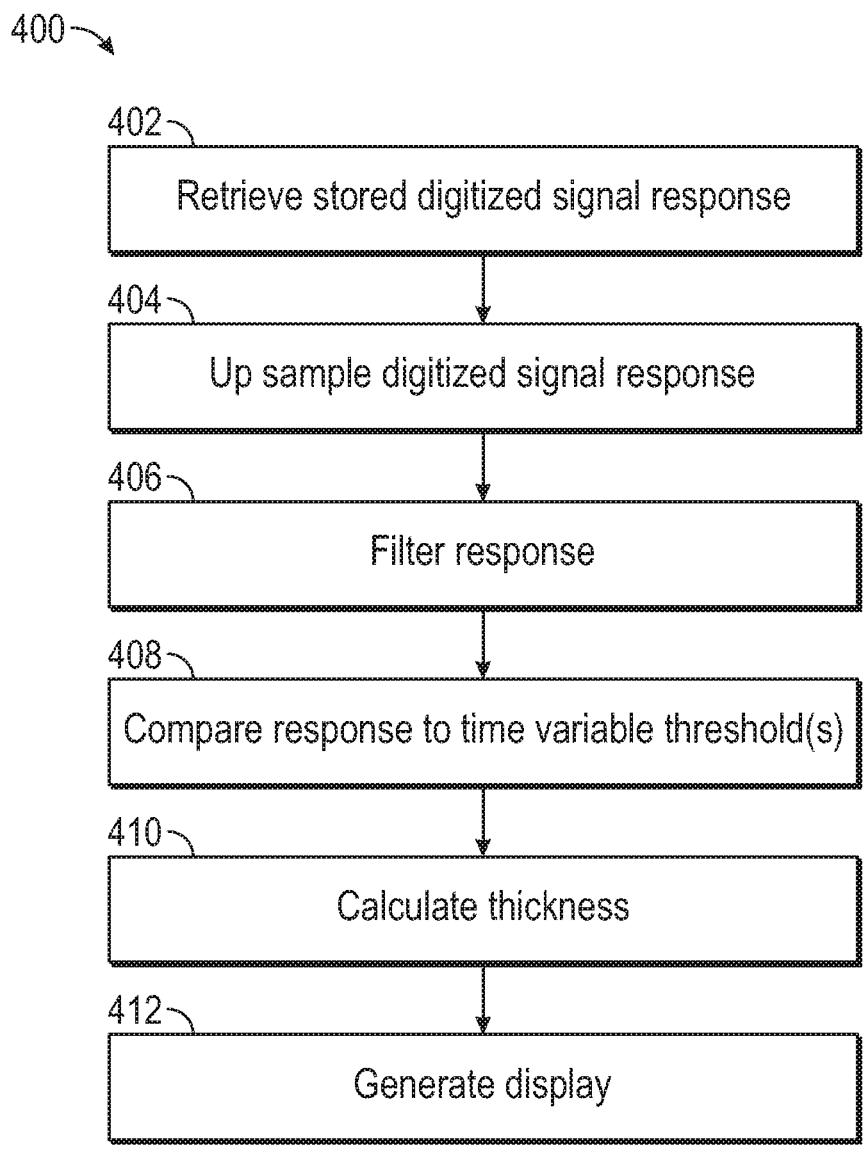
FIG. 4 is a flow diagram for a playback phase, according to an example of the present subject matter.

FIG. 4 is a flow diagram for a playback phase 400, according to an example of the present subject matter. At 402, a processor may retrieve the stored digitized signal response from a memory. At 404, the digitized signal response may be up sampled. For example, if the digitized signal response was originally sampled at a rate of 100 Mega-samples per second, it can be up sampled to 400 Mega-samples per second or higher by employing mathematical interpolation. The oversampling may be performed using an interpolating low pass filter technique, linear interpolation, or other suitable techniques. The oversampling may provider smoother curves and may refine zero crossings for more accurate detection.

At 406, the digitized signal response may be filtered to reduce noise. For example, a digital bandpass filter may be applied. The frequency of the bandpass filter may be centered around the frequency of the transducer probe.

At 408, the digitized signal response may be compared to one or more time-variable threshold(s) and crossing events of the digitized signal response and the time-variable threshold(s) may be detected. The time-variable threshold may vary based on time. Because the digitized signal response may attenuate with time because a fixed, specified gain was applied (as opposed to a time dependent gain), the time-variable threshold may detect peaks corresponding to echoes more effectively. For example, time-variable threshold curves may be calibrated based on inverting stored time corrected gain curves from prior testing. The time-variable thresholds may also be calibrated to omit the first crossing, which may result from an ultrasound artifact and thus may be a false positive.

At 410, one or more thickness(es) of the test object may be calculated based on the time-variable threshold crossing events, which may correspond to received echoes. Different techniques and/or modes be me used in the thickness calculations. With respect to modes, different modes may be supported. As discussed above, mode 1 may include measuring the time interval between the pulse that generates the ultrasound signal and the first returning echo from the back wall of the test object. Mode 2 may include measuring the time interval between an interface echo returned from a front wall to the back wall of the test object. Mode 3 may include measuring the time interval between an interface echo returned from the back wall to the front wall of the test object.

At 412, a display output may be generated. The signal response waveform may be compressed for display. The compression may allow fitting the waveform on a display without losing certain peaks. For example, the digitized signal response may be compressed in a vertically-oriented dimension for presentation of detected peaks on a display screen. Also, the digitized signal response may be compressed in a horizontally-oriented dimension to fit the display screen. The vertically- and/or horizontally-oriented compression may preserve the peaks without attenuation.

In an example, the signal response may be displayed but the time variance of the time-variable threshold may not be displayed to the user. Instead, the user may view flat threshold line, which the user is more accustomed to viewing. The processor may maintain the signal-to-threshold ratio throughout the timespan; therefore, the signal-to-threshold ratio may be scaled by a time variable scale factor, which may be the inverse of the time variable threshold. The resulting display may show a flat line threshold and a signal with a correct ratio throughout the timespan. Moreover, the processor may zoom into windows surrounding echoes to show the time-variable threshold as a flat line (the gain profile applied to the signal response may stay constant and may not change as in previous techniques). By zooming in, details of smaller echoes may be viewable. Also, the proportionality of the echoes and the crossing events may remain the same with the zoom windows.

Figure 5:
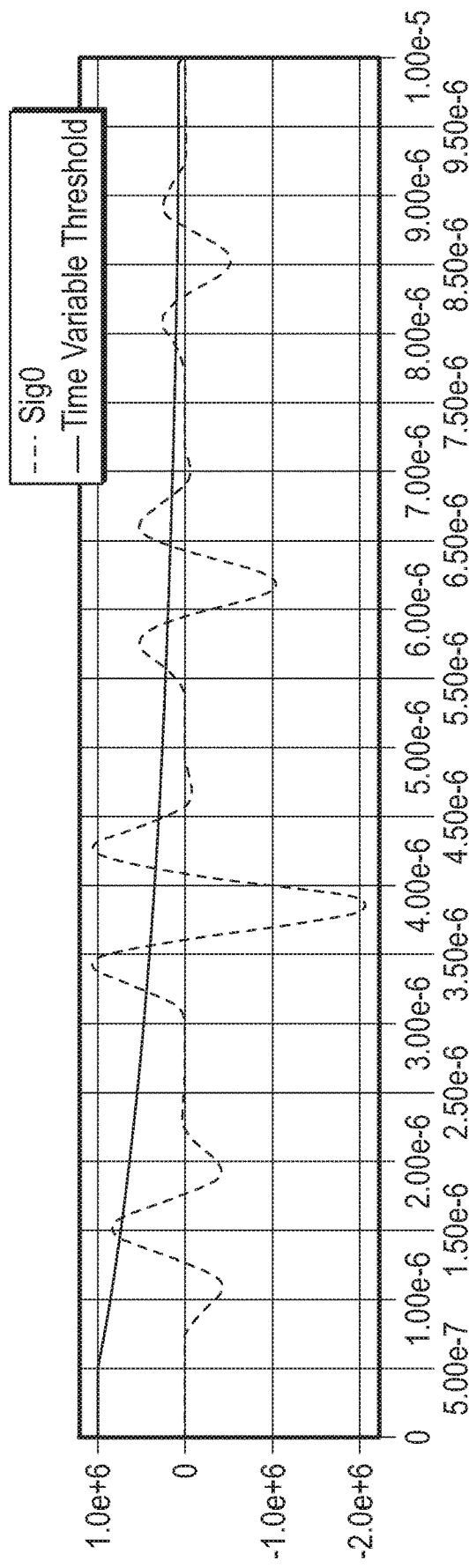
FIG. 5 illustrates a signal response and a time-variable threshold, according to an example of the present subject matter.

FIG. 5 illustrates crossing events of a signal response and a time-variable threshold, according to an example of the present subject matter. As shown, the time-variable threshold may decay with time, and the signal response (Sig0) may attenuate with time. The proportion of the signal response at the crossing events may be substantially maintained with the corresponding decay of the time-variable threshold. Moreover, as discussed above, the first crossing (at ~$1.50 \times 10^{-6}$ seconds) may be ignored as it may be the result of an ultrasound artifact.

Moreover, different techniques, such as precision and corrosion thickness measurements/monitoring may be utilized. For example, corrosion monitoring may be used for test objects with rusted surfaces (e.g., absence of a smooth surface). Corrosion monitoring may use a dual element transducer, where one of the elements may transmit ultrasound waves and the other element may receive the ultrasonic echoes. Both elements may be provided in a same case or housing, separated by an acoustic barrier.

Precision monitoring may be used when a testing object includes a smooth surface for testing. Precision monitoring may use a single element transducer, where a single element transmits ultrasound waves and receives the ultrasonic echoes, too. While corrosion monitoring may provide more coarse measurements (e.g., ±0.1 mm accuracy), precision monitoring may provide more fine measurements (e.g., ±0.01 mm accuracy). Different techniques for corrosion and precision monitoring using as single acquisition cycle are described below in further detail.

Next, examples of precision thickness measurement/monitoring using a single acquisition cycle are described. Precision thickness measurement may calculate a thickness of a testing object by detecting a highest in magnitude peak (e.g., largest peak) in the signal response, more specifically in a portion of the digitized signal response exceeding the time-variable threshold. The highest peak may be detected using speculative detection. A slave gate may be activated when a peak is detected, and if a larger peak is subsequently detected, the slave gate may be restarted.

For example, a first crossing of the digitized signal response and the time-variable threshold may be detected. Based on that first crossing, a magnitude of a peak associated with that first crossing may be calculated. A slave gate may be set accordingly. Next, a second crossing of the digitized signal response and the time-variable threshold may be detected. Based on that second crossing, a magnitude of a peak associated with that second crossing may be calculated. The peaks associated with the first and second crossing may be compared. If the second peak is greater in magnitude (e.g., amplitude), information regarding the second peak may be stored. Since a higher peak was detected, the slave gate may then be reset, and the method may continue searching for additional peaks, comparing those peaks with the stored highest peak. If, however, the first peak is greater in magnitude (e.g., amplitude) than the second peak, the slave gate may continue its decay and the method may continue search for additional comparing those peaks with the stored highest peak until the slave gate decays completely or is reset at the detection of a larger peak.

Figure 6:
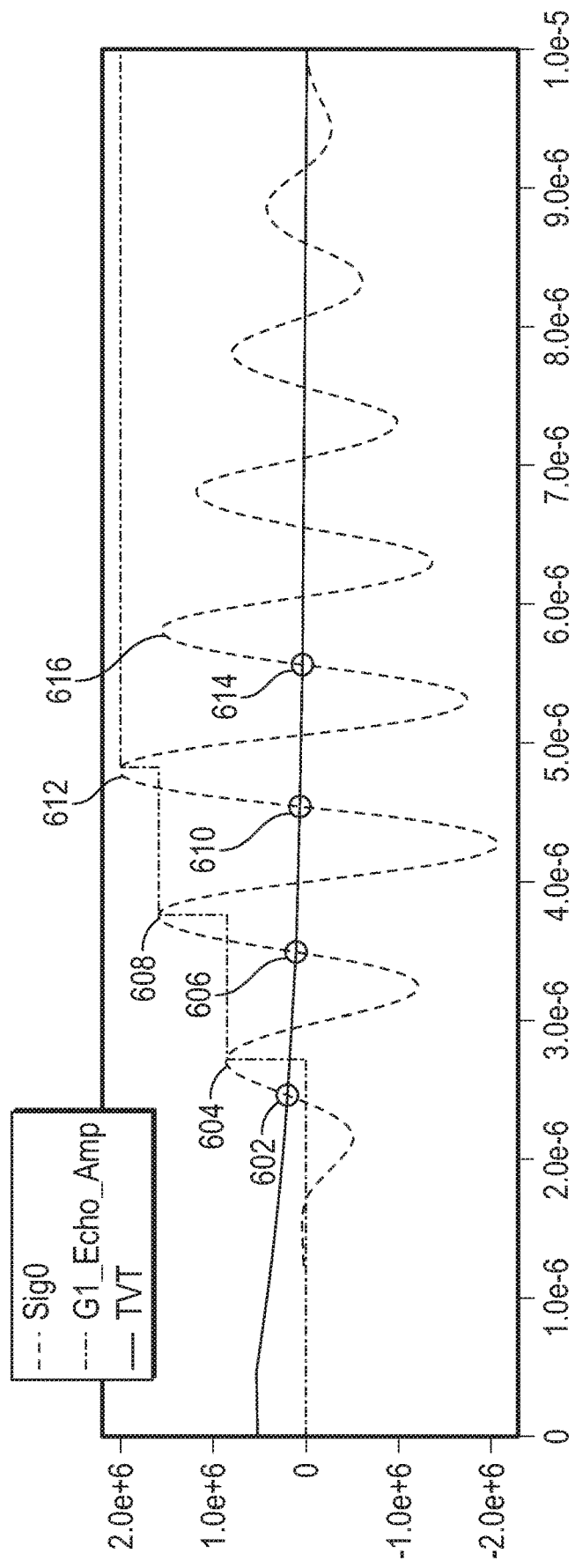
FIG. 6 illustrates a waveform undergoing precision monitoring, according to an example of the present subject matter.

FIG. 6 illustrates a waveform processed according to a precision monitoring scheme, according to an example of the present subject matter. As shown, a first crossing event 602 where the signal response (Sig0) may cross with the time-variable threshold (TVT) may be detected. Based on the first crossing event 602, a first peak 604 may be calculated. A slave gate may be set, and the gate may begin to decay with time. Based on a second crossing event 606, a second peak 608 may be calculated. Because the second peak 608 is greater in magnitude than the first peak 604, the second peak 608 may be stored as the highest peak and the slave gate may be reset. Based on a third crossing event 610, a third peak 612 may be calculated. Because the third peak 612 is greater in magnitude than the stored highest peak (e.g., second peak 608), the third peak 612 may be stored as the highest peak and the slave gate may be reset. Based on fourth crossing event 614, a fourth peak 616 may be calculated. Now, because the fourth peak 616 is lower in magnitude that the stored highest peak (e.g., third peak 612), the third peak 612 may be continuing to be stored as the highest peak and the slave gate may continue to decay. This process of detecting subsequent crossings and comparing their associated peaks with the stored highest peak may continue until the slave gate decays. In this example, the third peak 612 may be determined to be the highest peak. This peak may then be used in the precision calculation for the thickness of the object. A time index corresponding to the detected peak, indicative of the echo signal, can be used to calculate a time-of-flight of the ultrasound pulse. Thus, because velocity of the ultrasound signal through test object may be known or estimated, the distance or thickness of the object may be calculated based on the measured time of the echo. For example, a propagation velocity may be multiplied by a time-of-flight duration based on a time index of a detected peak, and a resulting product can be divided by two (or another appropriate factor depending path geometry) to provide a thickness estimate, because the round-trip propagation path from transmitter to receiver is at least two times the thickness of the object under test.

Figure 7:
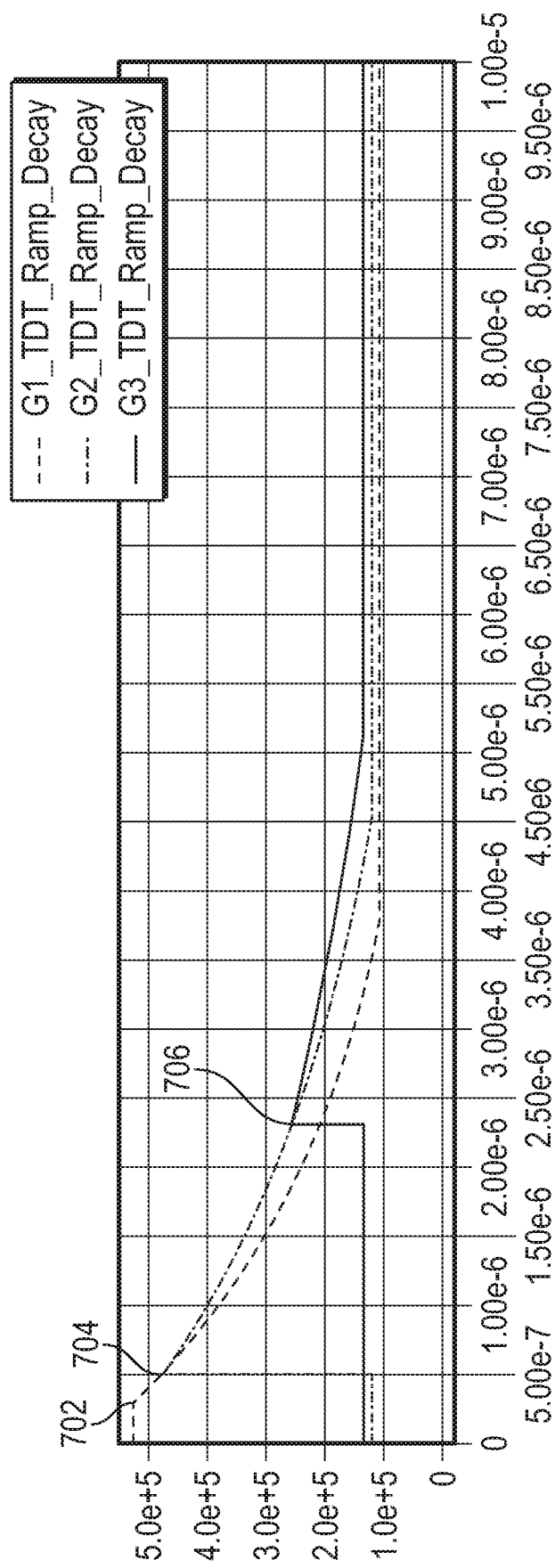
FIG. 7 illustrates a gate timing, according to an example of the present subject matter.

As mentioned above, slave gates may be used for speculative detection. FIG. 7 illustrates a slave gate timing, according to an example of the present subject matter. Slave gate ramp 702 may be the initial slave get set at the detection of the first peak. As shown, the slave gate ramp may be reset or restart at points 704 and 706, for example at the detection of larger peaks, as described above.

In an example, the largest peak may be detected in a gain corrected signal response. Here, although the signal response may have been gain corrected using a time dependent gain, the largest peak may be detected based on the largest proportion of signal to threshold.

Next, examples of corrosion thickness measurement/monitoring using a single acquisition cycle are described. Corrosion thickness measurement may calculate a thickness of a testing object by detecting a first peak in the signal response, more specifically in a portion of the digitized signal response exceeding the time-variable threshold. In an example, a zero-crossing associated with the first peak may be used in calculating the thickness of the object.

A crossing of the digitized signal response and the time-variable threshold may be detected. In an example, the time-variable threshold may include two thresholds: a positive threshold and a negative threshold. Based on the crossing, a low peak and a high peak associated with the crossing may be calculated. The low peak may correspond to a negative magnitude peak, and a high peak may correspond to a positive magnitude peak. Then, a zero crossing between the low and high peaks may be calculated. This zero crossing may then be used in corrosion thickness measurement. The zero crossing may correspond to the time of echo being measured. Thus, because velocity of the ultrasound signal through test object may be known, the distance or thickness of the object may be calculated based on the measured time of the echo.

Figure 8:
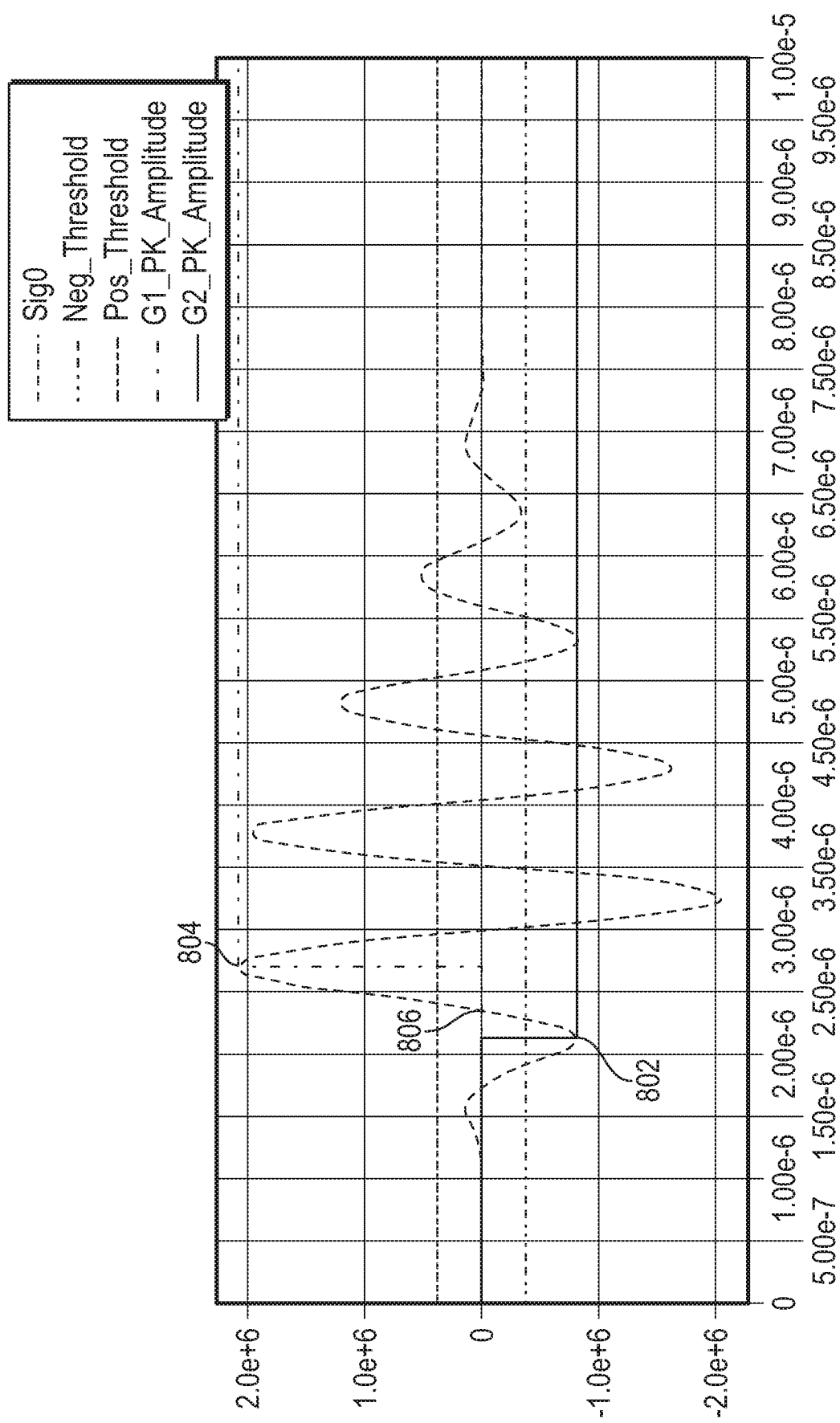
FIG. 8 illustrates a waveform undergoing corrosion monitoring, according to an example of the present subject matter.

FIG. 8 illustrates a waveform processed according to a thickness measurement in the presence of corrosion (e.g., a corrosion monitoring scheme), according to an example of the present subject matter. This example shows a positive and negative threshold. This example also shows a low peak 802 and a high peak 804 associated with the crossing of the negative and positive thresholds, respectively. This example further shows a zero crossing 806 between the low and high peaks, which may then be used in the corrosion thickness measurement.

The thickness measurement techniques described in this document provide faster and/or more accurate measurements, as compared to multi-pass or "iterative" techniques. The measurements are faster at least in part because of the capability to use as few as a single transmit/receive pulse acquisition cycle instead of multiple iterative passes to locate and size the echoes. The measurements are more accurate at least in part because of using a specified gain across the signal response and the use of a time-variable threshold without requiring applying a time-dependent gain on the signal response. The techniques shown and described in this document can be performed using a portion or an entirety of an inspection system 100 as shown in FIG. 1 or otherwise using a machine 900 as discussed below in relation to FIG. 9.

Figure 9:
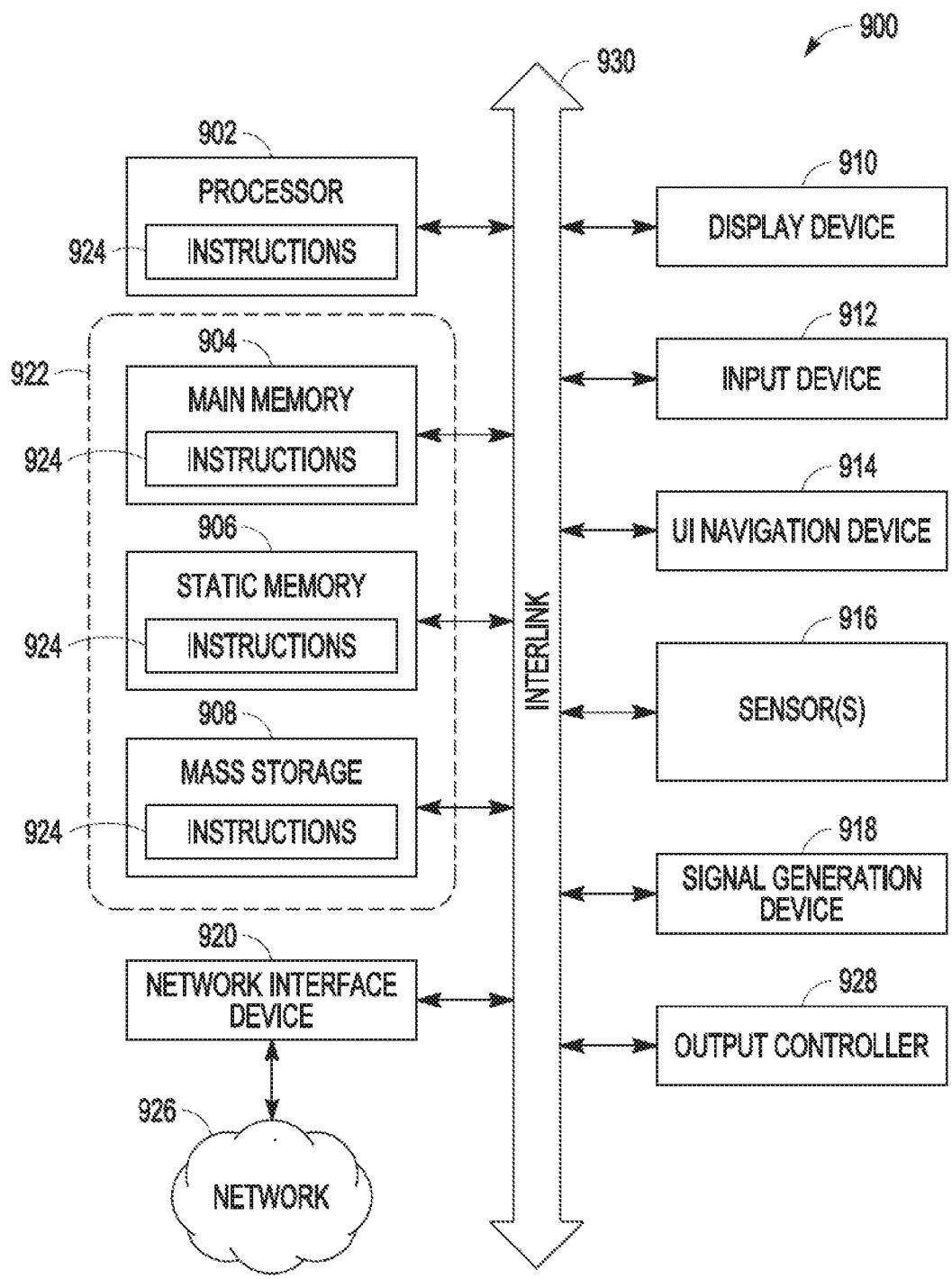
FIG. 9 illustrates a block diagram of an example comprising a machine upon which any one or more of the techniques (e.g., methodologies) discussed herein may be performed.

FIG. 9 illustrates a block diagram of an example comprising a machine 900 upon which any one or more of the techniques (e.g., methodologies) discussed herein may be performed. In various examples, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as W/i-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method comprising:
   in response to a transmitted ultrasound signal into a test object, acquiring from a transducer probe a signal response in one or more acquisition cycles, the signal response including an electrical representation of one or more echoes received from the test object;
   applying a gain profile across the signal response to generate an amplified signal response;

digitizing the amplified signal response to generate a digitized signal response; and calculating from the digitized signal response one or more thicknesses of the test object using at least one time-variable threshold based on one or more associated threshold crossing events.

2. The method of claim 1, wherein the signal response is acquired in a single acquisition cycle and wherein digitizing the amplified signal response includes performing a plurality of analog-to-digital conversions using one or more conversion circuits and blending outputs from the one or more conversion circuits corresponding to the plurality of analog-to-digital conversions to generate the digitized signal response.

3. The method of claim 1, wherein a plurality of signal responses are acquired in a plurality of acquisition cycles and wherein digitizing the amplified signal response includes performing a plurality of analog-to-digital conversions using one or more conversion circuits and time interleaving outputs from the one or more conversion circuits corresponding to the plurality of analog-to-digital conversions to generate the digitized signal response.

4. The method of claim 1, wherein calculating the one or more thicknesses comprises:
detecting a highest in magnitude peak in a portion of the digitized signal response exceeding the time-variable threshold.

5. The method of claim 4, wherein detecting the highest in magnitude peak comprises:
detecting a first crossing of the digitized signal response and the time-variable threshold;
based on the first crossing, calculating a peak associated with the first crossing;
detecting one or more subsequent crossings of the digitized signal response and the time-variable threshold;
calculating one or more peaks associated with the one or more subsequent crossings; and
comparing the peaks associated with the first crossing and the one or more subsequent crossings to determine a peak having a greatest amplitude.

6. The method of claim 1, wherein calculating the thickness comprises:
for a thickness measurement performed for corrosion monitoring, detecting a first peak of an echo in the digitized signal response using the time-variable threshold.

7. The method of claim 6, wherein detecting the first peak comprises:
detecting a crossing of the digitized signal response and the time-variable threshold;
based on the crossing, calculating a low peak associated with the crossing and a high peak associated with the crossing;
determining a zero crossing between the low and high peaks; and
calculating the thickness of the test object based on the zero crossing.

8. The method of claim 1, further comprising:
up sampling the digitized signal response; and
filtering the digitized signal response.

9. The method of claim 1, further comprising:
compressing the digitized signal response in a vertically-oriented dimension for presentation of detected peaks on a display screen; and
compressing the digitized signal response in a horizontally-oriented dimension.

10. The method of claim 1, further comprising:
calibrating the time-variable threshold based on inverting a stored time corrected gain curve.

11. An inspection system comprising:
a transducer probe to transmit an ultrasound wave into a test object and to receive one or more reflections of the transmitted ultrasound wave and to convert the one or more reflections into an electrical signal in one or more acquisition cycles;
an analog circuit to amplify the electrical signal with a gain profile across the electrical signal and to convert the amplified electrical signal into a digital signal; and
a processor to calculate from the digital signal one or more thicknesses of the test object using at least one time-variable threshold based on one or more associated threshold crossing events.

12. The inspection system of claim 11, wherein the analog circuit comprises a plurality of analog-to-digital converters and a digital mixer to blend outputs from the plurality of analog-to-digital converters to generate the digital signal.

13. The inspection system of claim 11, wherein the analog circuit comprises a plurality of analog-to-digital converters and a mixer to time interleave outputs from the plurality of analog-to-digital converters to generate the digital signal.

14. The inspection system of claim 11, wherein calculating the one or more thicknesses comprises:
detecting a highest in magnitude peak in a portion of the digital signal exceeding the time-variable threshold.

15. The inspection system of claim 14, wherein detecting the highest in magnitude peak comprises:
detecting a first crossing of the digitized signal response and the time-variable threshold;
based on the first crossing, calculating a peak associated with the first crossing;
detecting one or more subsequent crossings of the digitized signal response and the time-variable threshold;
calculating one or more peaks associated with the one or more subsequent crossings; and
comparing the peaks associated with the first crossing and the one or more subsequent crossings to determine a peak having a greatest amplitude.

16. The inspection system of claim 11, wherein calculating the thickness comprises:
for a thickness measurement performed for corrosion monitoring, detecting a first peak of an echo in the digitized signal response using the time-variable threshold.

17. The inspection system of claim 16, wherein detecting the first peak comprises:
detecting a crossing of the digitized signal response and the time-variable threshold;
based on the crossing, calculating a low peak associated with the crossing and a high peak associated with the crossing;
determining a zero crossing between the low and high peaks; and
calculating the thickness of the test object based on the zero crossing.

18. A non-transitory computer readable medium embodying instructions that, when executed by a machine, cause the machine to perform operations comprising:
receiving a digitized signal response having a specified gain; and
calculating from the digitized signal response one or more thicknesses of the test object using at least one time-variable threshold based on one or more associated threshold crossing events.

19. The non-transitory computer readable medium embodying instructions of claim 18, wherein calculating the one or more thicknesses comprises:
   detecting a highest in magnitude peak in a portion of the digitized signal response exceeding the time-variable threshold.

20. The non-transitory computer readable medium embodying instructions of claim 19, wherein detecting the highest in magnitude peak comprises:
   detecting a first crossing of the digitized signal response and the time-variable threshold;
   based on the first crossing, calculating a peak associated with the first crossing;
   detecting one or more subsequent crossings of the digitized signal response and the time-variable threshold;
   calculating one or more peaks associated with the one or more subsequent crossings; and
   comparing the peaks associated with the first crossing and the one or more subsequent crossings to determine a peak having a greatest amplitude.

21. The non-transitory computer readable medium embodying instructions of claim 18, wherein calculating the thickness comprises:
   for a thickness measurement performed for corrosion monitoring, detecting a first peak of an echo in the digitized signal response using the time-variable threshold.

22. The non-transitory computer readable medium embodying instructions of claim 21, wherein detecting the first peak comprises:
   detecting a crossing of the digitized signal response and the time-variable threshold;
   based on the crossing, calculating a low peak associated with the crossing and a high peak associated with the crossing;
   determining a zero crossing between the low and high peaks; and
   calculating the thickness of the test object based on the zero crossing.

\* \* \* \* \*